R. N. TRANE.
THERMOSTATIC VALVE.
APPLICATION FILED MAR. 21, 1919.
1,371,060.
Patented Mar. 8, 1921.
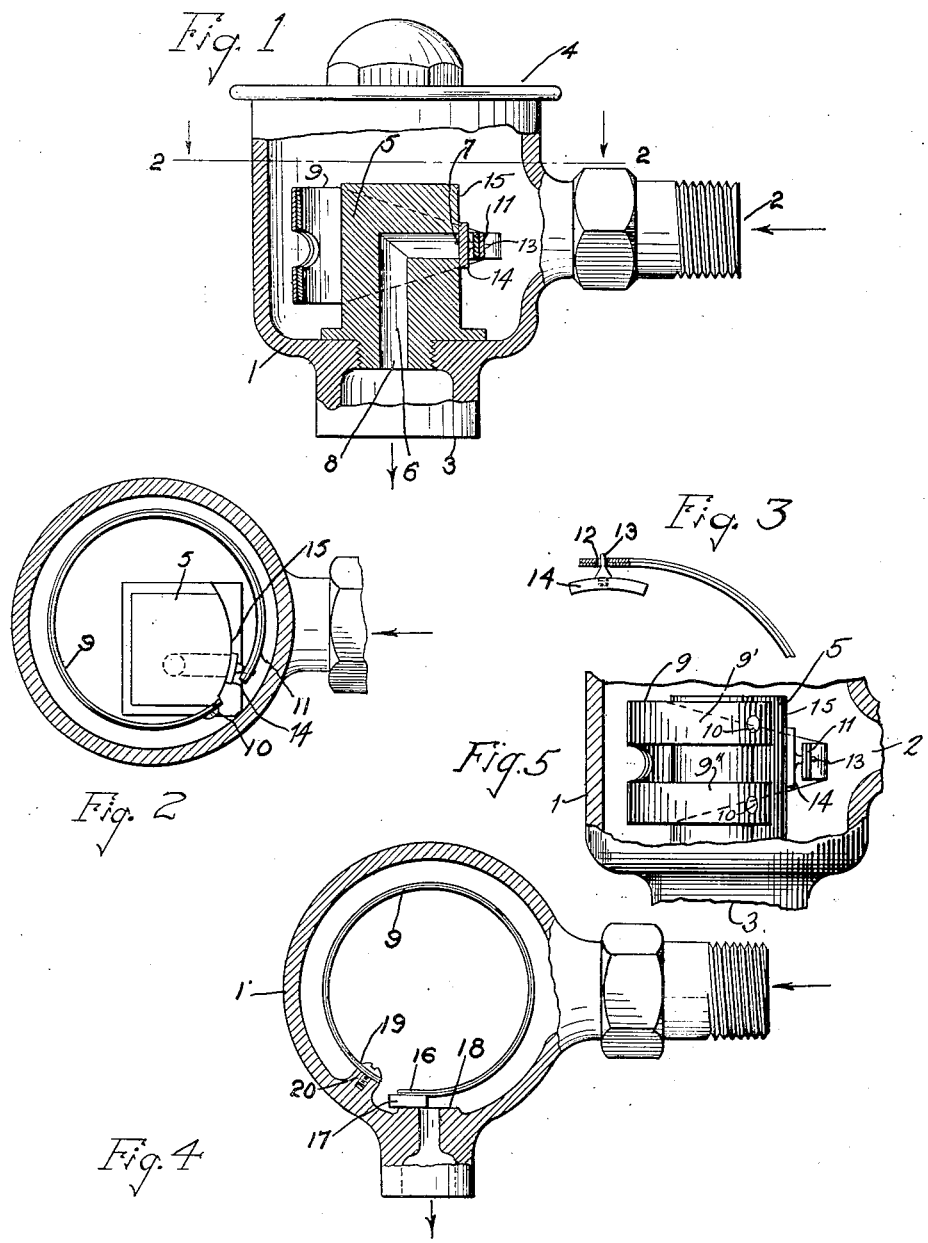
WITNESSES
Robert Burns
A. L. Kitchin
INVENTOR
REUBEN N. TRANE
BY
ATTORNEYS

UNITED STATES PATENT OFFICE.

REUBEN N. TRANE, OF LA CROSSE, WISCONSIN.

THERMOSTATIC VALVE.

1,371,060. Specification of Letters Patent. Patented Mar. 8, 1921.

Application filed March 21, 1919. Serial No. 283,987.

*To all whom it may concern:*

Be it known that I, REUBEN N. TRANE, a citizen of the United States, and a resident of La Crosse, in the county of La Crosse and State of Wisconsin, have invented a new and Improved Thermostatic Valve, of which the following is a full, clear, and exact description.

This invention relates to thermostatic control for valves and has for an object the provision of an improved construction of a thermostatic member whereby the valve gate or member may be opened and closed easily and may be comparatively sensitive to changes in temperature.

Another object in view is the provision of an improved thermostatic control which may be used on traps or other valves to open and close same by a slight back and forth movement of the valve member.

A further object of the invention is to provide a circular thermostatic member in connection with a sliding valve member or gate for controlling a port.

In the accompanying drawing:

Figure 1 is a side view, with certain parts shown in section, of a valve disclosing an embodiment of the invention.

Fig. 2 is a section through Fig. 1 on line 2—2.

Fig. 3 is an enlarged bottom plan view of a portion of a thermostatic member and a valve carried thereby.

Fig. 4 is a sectional view similar to Fig. 2, but disclosing a slightly modified form of the invention.

Fig. 5 is a detail view of a post and the thermostatic member secured thereto.

Referring to the accompanying drawing by numerals, 1 indicates a valve casing which is shown with a trap, though it is, of course, evident that the invention could be applied to any form of valve without departing from the spirit of the invention. The casing 1 is provided with an inlet 2 and an outlet 3 together with a suitable cap 4 which may be held in place in any desired manner, as for instance by threads. Arranged in the casing 1 and threaded in to the outlet is a post 5 which has a passageway 6 extending therethrough merging into what may be termed an inlet port 7 and an outlet port 8. A circular shaped thermostatic member 9 is rigidly secured to post 5 by rivets, screws 10, or by other means as desired, said securing means being arranged at one end of the thermostatic member, while the free end 11 is preferably provided with an opening 12 through which a rod 13 extends, said rod being threaded into or otherwise rigidly secured to the gate or valve member 14. This gate is preferably arc-shaped for fitting against the arc-shaped surface 15 of the post 5 so as to freely slide back and forth over the port 7 so as to close the same entirely or partially according to the amount of heat to which the thermostatic member 9 may be subjected.

In connection with this thermostatic member it is evident that the same may be a single band divided at one point, or may be a comparatively wide band narrowed at the fixed end and the free end, or divided for providing arms 9′ and 9″ as indicated in Fig. 1. A thermostatic member made in a circle will naturally move in a circular manner in an attempt to enlarge or contract according to the changing temperature. The free end 11 may be sprung somewhat toward or from the center of the circle of the member 9 so that there will always be a pressure on the gate 14 for causing the same to engage the surface 15 as the thermostatic member expands and contracts. As the thermostatic member expands and contracts a circular movement of the free end 11 will result which in turn will cause a slight back and forth movement of the gate, said movement requiring comparatively little effort and consequently the thermostatic member will be very sensitive to changes of temperature. This is especially advantageous in heating systems, or where an even temperature is very desirable.

In Fig. 4 a slightly modified form of the invention is provided in which the post 5 is eliminated and the free end 16 of the thermostatic member 9 is sprung outwardly or radially away from the center of the ring so that the gate 17 will always press against its seat 18 which may be circular if desired, though shown flat in the drawing. The fixed end 19 is secured to a suitable projection 20 on the casing 1′ so that as the thermostatic member 9 expands there will be a circular or substantially rotary movement of the free end 16 for sliding the gate 17 in one direction which sliding movement is reversed when the thermostatic member contracts.

What I claim is:

1. A thermostatic valve of the character described comprising a casing provided with an inlet and an outlet, a post arranged in said casing formed with a passageway therethrough, one end of which merges into said outlet and the other into an auxiliary inlet, a valve member positioned to move transversely of said auxiliary inlet, and a thermostatic spring member connected to the post and to said valve member for moving the valve member back and forth so as to open and close said auxiliary port, and for holding the valve member in contact with said post.

2. A thermostatic valve comprising a casing having an inlet and an outlet, a post arranged in said casing, a passage-way arranged in said post, a sliding gate positioned in contact with the post for closing said passage-way, and a circular thermostatic spring member encircling said post and having one end rigidly secured to said post and the other end secured to said gate, said gate being held continually in close contact with said post.

3. In a thermostatic valve, a casing having an inlet and an outlet, at right angles to each other, a post threaded into said outlet having an L-shaped passageway with one end merging into said outlet and the other facing said inlet, a valve member slidable across the opening of the post facing said inlet, and a thermostatic member for holding the valve member against said post and for moving the valve member back and forth so as to cover and uncover the passageway in the post, said thermostatic member comprising a sheet of material pointed at one end secured to the valve member and bifurcated at the other end, the end portions of the bifurcated end being rigidly secured to the post, said thermostatic member being formed substantially as a circle.

REUBEN N. TRANE.